Dec. 10, 1963   E. E. TUTTLE   3,113,647
BRAKE DRUM
Filed Nov. 9, 1961

INVENTOR.
ELVIN E. TUTTLE
BY
Barnes, Kisselle, Raisch, & Choate
ATTORNEYS

United States Patent Office 3,113,647
Patented Dec. 10, 1963

3,113,647
BRAKE DRUM
Elvin E. Tuttle, Lansing, Mich., assignor to Motor Wheel Corporation, Lansing, Mich., a corporation of Michigan
Filed Nov. 9, 1961, Ser. No. 151,336
7 Claims. (Cl. 188—218)

This invention relates to improvements in frictional wear surfaces and more particularly to an improved brake drum structure.

One of the most difficult problems encountered in the design of vehicle brakes is the disposal of frictional heat generated when the brakes are applied. Hard, wear-resistant materials such as cast iron, steel and the like have long been used to form brake drum wear surfaces. These hard materials provide the surface characteristics necessary to the proper operation of braking devices. However, such hard materials do not have high heat conductivities and as a result of their heat transmission characteristics do not permit rapid transfer of heat therethrough. On the other hand, those materials having high heat conductivity such as silver and aluminum are generally considered to be poorly adapted for use as frictional wear surfaces.

It is an object of the present invention to provide an improved composite frictional wear surface adapted to facilitate dissipation of frictional heat.

A further object is to provide an improved composite brake drum structure capable of improved heat transmission therethrough without impairing the strength or frictional characteristics of the wear surface.

Another object of the present invention is to provide an improved composite brake drum having the above characteristics which is light in weight, structurally sound and inexpensive to manufacture.

The present invention provides an improved frictional wear surface comprising a wear linear composed of a random mass of tangled fibers of material having the desired wear properties which are embedded in a backing material of high heat conductivity in such a manner that the backing extends throughout the wear liner to provide a composite wear surface.

Figure 1:
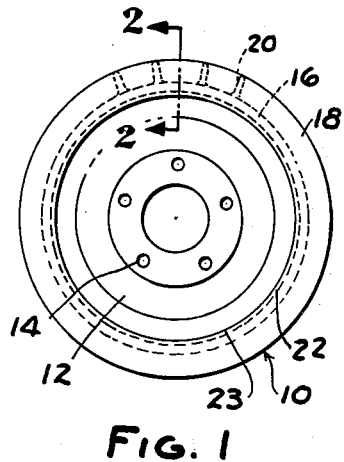
FIG. 1 is an elevational view of a finished brake drum constructed in accordance with the present invention.

A preferred embodiment employing this construction is shown in FIG. 1 and comprises a cylindrical-type brake drum having a disc portion 12 provided with mounting bolt holes 14 and a cylindrical wall portion 16 connecting disc 12 with a frusto-conical flange 18. A series of integral reinforcing ribs 20 are provided on the exterior surfaces of wall 16 and flange 18 which also serve as cooling fins. A wear liner 22 is embedded in wall 16 of the brake drum adjacent to and forming part of the inner circumferential braking surface 23 thereof.

Figure 3:
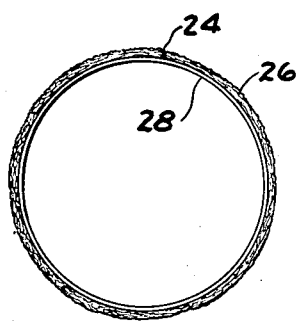
FIG. 3 is a plan view illustrating a method of forming a wear liner insert for a brake drum in accordance with the present invention.

The above brake drum is preferably made in one piece by casting the drum in a conventional mold in accordance with the following method. The wear liner 22 is first formed by making a loop of metallic wool. As shown in FIG. 3, this may be conveniently done by interconnecting the ends 24 of an elongated mass of metallic wool 26, and then stretching the loop thus formed over a circular hoop 28 having an outside diameter equal to the inside diameter of the braking surface 23 of brake drum 10. The loop of metallic wool is then preheated and placed in the drum mold with its inner periphery adjacent to the core which forms the braking surface 23. The molten backing material, preferably a structural aluminum alloy such as Alcoa 319, is then poured into the mold and quickly flows through the porous mat of metallic wool as the mold cavity is filled with the aluminum alloy. The aluminum alloy is allowed to solidify, thus forming a strong unitary braking drum. The inside diameter of wall 16 of the brake drum is preferably made slightly smaller than the final diameter of braking surface 23, and the final dimension is obtained by machining the inside diameter of wall 16 to provide the braking surface.

Figure 2:
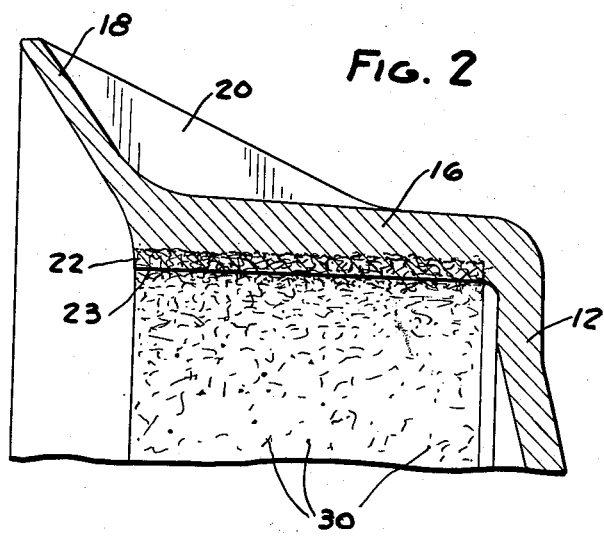
FIG. 2 is a sectional view taken on the line 2—2 of FIG. 1.

The machined braking surface 23 is best shown in FIG. 2 and comprises a large number of relatively hard metallic wool fiber ends 30 exposed in a matrix of structural aluminum alloy. These ends form a hard, discontinuous braking surface, while the aluminum alloy presents a high conductivity path to carry away the heat produced at the braking surface.

Figure 4:
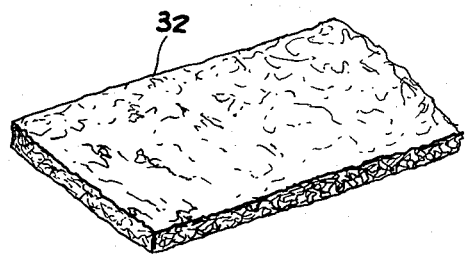
FIG. 4 is a fragmentary perspective view of a portion of another form of wear liner useable in the present invention.
Figure 5:
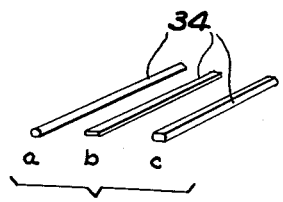
FIG. 5 is a greatly enlarged fragmentary perspective view illustrating variations in the cross-sectional shape of the fibers comprising the wear linear insert of the present brake drum.

While good results have been obtained by employing ordinary, commercially available stainless steel wool to form the metallic wool insert or liner 22, equal or better results were obtained by using bronze wool in the same manner. The characteristics of such metallic wool materials have been found to provide an ideal structure when combined with a cast aluminum alloy brake drum to provide a composite brake drum. The metallic wool is easily shaped to form the annular liner 22 and comprises a random mass of tangled fibers of hard material having desirable wear characteristics. It is inexpensive to produce and may be preshaped as it is manufactured by forming it in a matted wool ribbon 32 (FIG. 4) which is cut into strips of the correct length for the brake drums. The individual strands 34 of the metallic wool ribbon 32 are shown in FIG. 5 to illustrate various cross-sectional strand shapes a, b and c commercially available in metallic wool material.

Due to the random arrangement of the hard metal fibers comprising the metallic wool, with the fibers extending in all directions even at the surface of the material, a very strong interlocking mechanical bond is obtained between the aluminum alloy backing material and the metallic wool loop, in addition to any chemical or molecular bond obtained in casting. The metallic wool loop is very porous and is easily filled with the molten aluminum alloy. The aluminum alloy surrounds the contacts the preheated metal fibers of the insert over substantially the entire area of each fiber except for those surfaces 30 of the fibers which are exposed at the braking surface 23 of the drum. This materially contributes to the structural reinforcement of wall 16. It also provides excellent heat transmission characteristics due to the large amount of area of the metallic wool insert in contact with the aluminum alloy and due to the multitudinous paths of aluminum alloy running from braking surface 23 to the exterior surface of wall 16.

When the braking surface 23 is formed by machining the inside diameter of wall 16, the fiber ends 30 are disposed in a random pattern which includes not only the ends of the fibers but straight portions and bends thereof which happen to be lying adjacent to the braking surface. As the braking surface wears in use, the proportion of aluminum alloy disposed in the braking surface remains substantially constant but the pattern of hard metal fibers varies in a random manner in accordance with the random distribution and arrangement of the fibers so that the wear surface exposed to engagement with the brake shoe lining constantly changes. This insures maximum frictional engagment between the brake shoe lining and the braking surface of the drum throughout the life of the drum.

Brake drums constructed in accordance with the above description have proven to have a better resistance to fading and better recovery after fading than conventional cast iron drums, the use of aluminum alloy with the metallic wool insert also provides a drum which weighs less and is less expensive to manufacture than previous composite brake drums. In addition, the metallic wool insert in aluminum alloy produces a structurally sound drum, thus overcoming one of the chief disadvantages of previous all aluminum alloy brake drums.

I claim:

1. A brake drum comprising an annular body including a wall having one surface shaped to form a braking surface adapted to be engaged by a brake element and having an opposite surface adapted for transferring heat from said wall and a wear liner comprising a layer of a random mass of fibers of hard material loosely entangled with one another in a relatively open network which is highly porous to a backing material when said backing material is in a molten state, said fibers being embedded in said wall adjacent to and substantially coextensive with said braking surface thereof with random portions of said fibers exposed in a random pattern at said braking surface, said wall comprising a continuous mass of said backing material in a solid state thermally engaging said wear liner fibers by substantially complete engulfment thereof and comprising the major material of said wall.

2. The combination set forth in claim 1 wherein said wear liner comprises a metallic wool insert.

3. The combination set forth in claim 1 wherein said fibers of said wear liner are made of stainless steel.

4. The combination set forth in claim 1 wherein said fibers of said wear liner are made of bronze.

5. The combination set forth in claim 1 wherein said backing material of said wall of said brake drum body comprises material selected from the class consisting of aluminum and structural aluminum alloys.

6. The combination set forth in claim 1 wherein said brake drum wall comprises a continuous substantially cylindrical member and said braking surface thereof is machined concentric with the cylindrical axis of said wall, and wherein said wear liner comprises an elongated band of metallic wool interconnected at its ends to form a hoop adapted to be disposed between said surfaces of said wall.

7. The combination set forth in claim 1 wherein said brake drum comprises a one-piece casting and said wear liner comprises a preformed band of metallic wool embedded as an insert in said casting.

References Cited in the file of this patent

UNITED STATES PATENTS

| | | |
|---|---|---|
| 903,049 | Bonner | Nov. 3, 1908 |
| 1,394,402 | Birkigt | Oct. 18, 1921 |